Nov. 17, 1931.    J. M. G. FULLMAN    1,831,856
CONNECTER FOR ELECTRICAL CONDUIT SYSTEMS
Filed Jan. 24, 1930
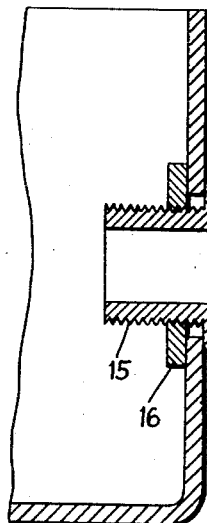
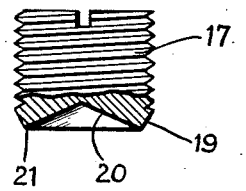
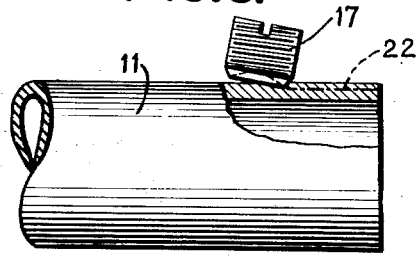
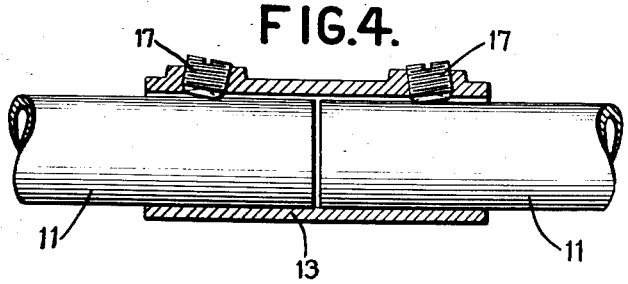
Inventor
James M. G. Fullman
By his Attorneys
Cooper, Kerr & Dunham Patented Nov. 17, 1931

1,831,856

UNITED STATES PATENT OFFICE

JAMES M. G. FULLMAN, OF SEWICKLEY, PENNSYLVANIA, ASSIGNOR TO NATIONAL ELECTRIC PRODUCTS CORPORATION OF NEW YORK, N. Y., A CORPORATION OF DELAWARE

CONNECTER FOR ELECTRICAL CONDUIT SYSTEMS

Application filed January 24, 1930. Serial No. 422,999.

This invention relates to improvements in connecting devices for electrical conduit systems and more particularly the invention relates to so-called "threadless" fittings in which threading of the end of a conduit is obviated.

In the use of metal tubing, pipes or so-called metal conduit in electrical wiring systems, it frequently becomes necessary to couple separate lengths of conduit together and it is also necessary to connect the conduits to outlet boxes, switch boxes and the like at so-called knockout openings.

Heretofore, the previously preferred method of making connections has been to cut threads upon the ends of the conduits and utilize threaded couplings for connecting sections of conduit together or to utilize locknuts and bushings for connecting the conduits to the boxes. These previous practices of establishing connections required that the threads be cut upon the job and when light walled conduit or tubing is employed the cutting of the threads dangerously weakens the tubing.

To obviate these and other disadvantages previous efforts have been made to provide a form of connection to afford a threadless fitting. Such threadless fittings heretofore have required a large number of cooperating parts and have accordingly been expensive. Installation of such previous threadless fittings has also been difficult because wrenches were required to tighten the fittings and the necessity for the use of wrenches made it difficult, if not impossible to install such fittings in close spaces. Heretofore various types of set screw fittings have been provided which, however, have not been entirely satisfactory.

The present invention has for its object the provision of a threadless connecter for conduits and the like which will not only obviate the disadvantages of previous fittings but which will be cheap to manufacture, easy to install and which when installed will securely hold the tube or pipe to the desired box parts or to adjacent sections of pipe.

A further object of the present invention resides in the provision of a set screw type of connecter wherein a set screw of novel configuration is employed disposed in a novel manner to provide for improved gripping of the pipe or conduit.

A further object of the present invention resides in the provision of an improved connecter which will provide a positive ground connection between the conduit or pipe and other cooperating parts.

A further object of the present invention resides in the provision of a set screw mounted in a manner tending to prevent its loosening in service.

Further objects and advantages of the present invention will be hereinafter set forth in the accompanying specification and claims and shown in the drawings, which by way of illustration show what I now consider to be a preferred embodiment of the invention.

In the drawings:

Figure 1 shows my improved connecter utilized for securing a pipe or conduit in the knock-out opening of an outlet or switch box;

Fig. 2 is an enlarged view of the set screw which is shown in Fig. 1;

Fig. 3 is an enlarged view of certain of the parts shown in Fig. 1 and illustrates the manner in which the set screw bites into the surface of the conduit or pipe; and Fig. 4 illustrates a coupling for two sections of pipe or conduit employing my novel connecter.

In Fig. 1, 10 represents the wall portion of a box provided with an opening such as a knock-out opening and to which a pipe or conduit 11 is to be connected. 12 generally designates the connecter or coupling part. This part includes a female coupling or barrel portion 13 having adjacent thereto a shouldered portion 14 and an extended threaded neck 15. This neck is passed through the opening in the box and a lock nut 16 is applied thereto and tightened until it abuts the inner box wall and draws the shoulder 14 against the outer wall of the box. The parts just described constitute the previously well known means of applying connecters to boxes.

The barrel or female coupling portion of the connecter is provided with a threaded opening 16 to receive a set screw 17. The opening is at a slight angle as indicated at 18 in lieu of extending perpendicularly towards the pipe as hertofore. The screw 17 as best shown in Fig. 2 is externally chamfered as shown at 19 and is also interiorly recessed at its end as shown at 20 to provide a sharp annular biting edge 21.

In connecting up a conduit or pipe 11 to a box 10 the unthreaded end of the pipe is fitted into the female coupling or barrel part 13 and the set screw tightened up. One portion of the sharp annular edge of the set screw then cuts into and bites into the surface of the pipe forcing the opposite side of the pipe tightly into contact with the barrel. By disposing the set screw at an angle and providing the inner recess 20 and the outer chamfered edge 19, several advantages accrue. First the biting action is improved because a limited amount of the sharp edge bites into the pipe, also when an endwise pull is exerted upon the pipe which would tend to remove it from the connecter barrel, the sharp edge will constitute a somewhat broad plowing edge and necessitate a relatively broad groove being gouged out from the pipe before the pipe can be withdrawn (see the dotted line 22, Fig. 3). The angle of the interior recessed portion 20 in the end of the set screw is such that the sharp edge is reinforced by the material of the screw so that the edge will not be broken off when an attempt is made to withdraw the pipe.

The angular relation of the set screw with respect to the pipe tends to aid in locking the pipe in the barrel against withdrawal inasmuch as a withdrawing movement tends to tip the set screw in its mounting, thereby causing the sharp biting edge of the set screw to become more deeply embedded in the pipe and thus greatly increase the resistance against forceable removal.

The angular relation of the set screw with respect to the pipe and the barrel, tilts the set screw in its threaded opening thus causing a tight binding action between the threads on the set screw and the threads of the opening in which it is mounted, resulting in a locking action which overcomes the tendency to loosen under vibration.

The coupling for adjacent sections of pipe shown in Fig. 4 embodies the same general features and requires no detailed explanation, except to state that the female coupling part 13 receives two pipes and is provided with two set screws each at an angle as shown.

What I claim is:

1. A connecter device for pipe fittings in electrical conduit systems including a female coupling element adapted to receive a pipe and having a set screw mounted therein with its axis disposed at an acute angle with that part of the received pipe which is innermost in the coupling, said set screw having its inner end provided with a sharp marginal biting edge for the purpose described.

2. A connecter device for connecting pipes in electrical conduit systems to cooperating parts comprising a female coupling element, a set screw carried thereby and provided with an outer chamfered portion and an inner recessed portion to provide an annular sharp biting edge which is interiorly reinforced, said coupling element being provided with a threaded aperture to receive the set screw, the axis of which is disposed, for self-locking of the screw, at an acute angle with that part of the surface of the pipe to be connected which is innermost in the coupling whereby only a portion of the marginal sharp biting edge bites into the inserted pipe.

3. A connecter device for coupling pipes in electrical conduit systems including a set screw provided with a sharp marginal annular biting edge for the purpose described, and means for mounting the set screw at an acute angle with that part of the pipe to be connected which is innermost in the device, to provide localized and self-locking biting action by a portion of the marginal biting edge of the set screw.

4. A connecter for electrical conduits comprising a body portion adapted to receive a conduit, and a set screw having a marginal biting edge and disposed at an acute angle with that part of the received conduit which is innermost in the body portion, whereby the set screw is caused to tilt and bind in the threaded opening for the purpose described.

In testimony whereof I hereto affix my signature.

JAMES M. G. FULLMAN.